April 8, 1924.
O. W. VALLIER
1,489,621
SPEEDOMETER ACTUATED ROAD GUIDE
Filed March 31, 1921　　2 Sheets-Sheet 1
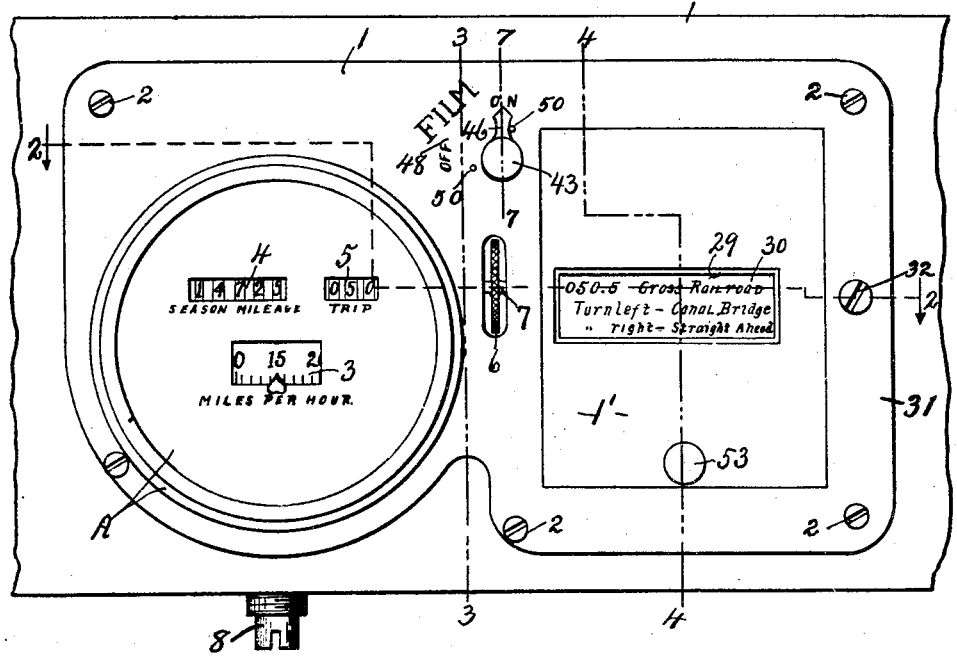
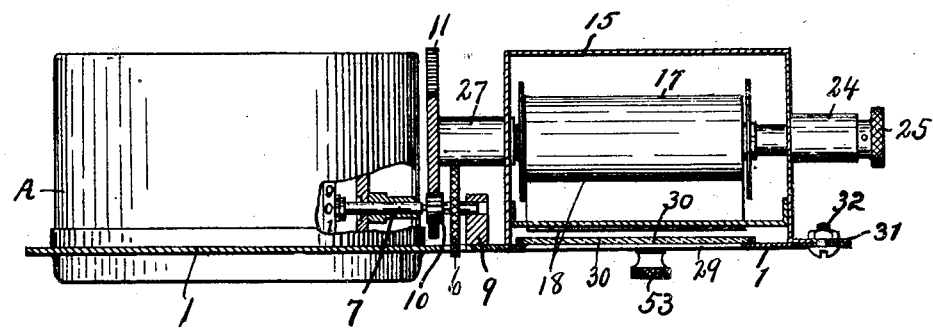

April 8, 1924.  1,489,621
O. W. VALLIER
SPEEDOMETER ACTUATED ROAD GUIDE
Filed March 31, 1921   2 Sheets-Sheet 2
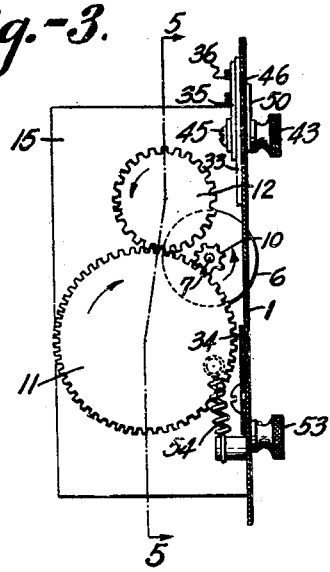
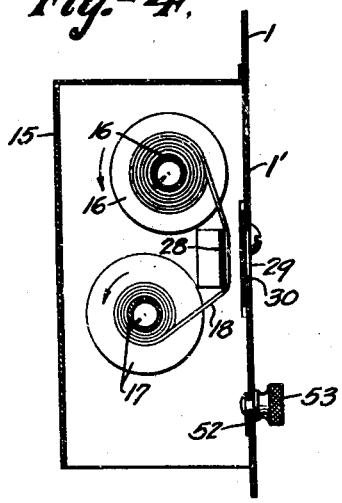
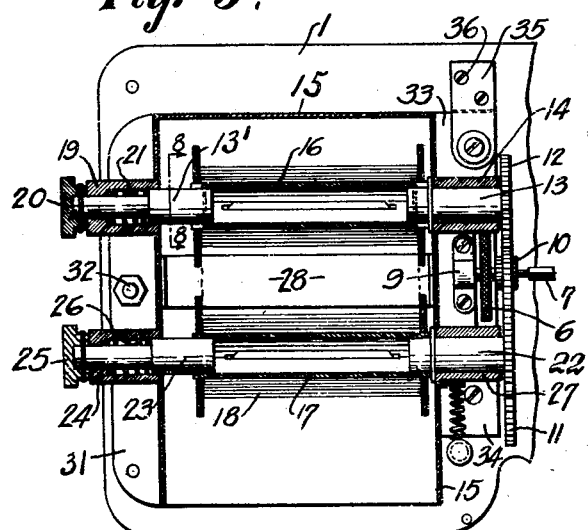
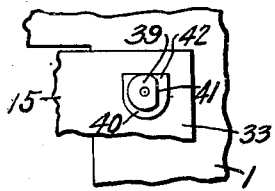
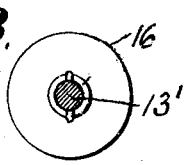

Patented Apr. 8, 1924.

1,489,621

UNITED STATES PATENT OFFICE.

ORVIS W. VALLIER, OF WATERTOWN, NEW YORK.

SPEEDOMETER-ACTUATED ROAD GUIDE.

Application filed March 31, 1921. Serial No. 457,373.

*To all whom it may concern:*

Be it known that I, ORVIS W. VALLIER, a citizen of the United States, and resident of Watertown, in the county of Jefferson, in the State of New York, have invented new and useful Improvements in a Speedometer-Actuated Road Guide, of which the following, taken in connection with the accompanying drawings, is a full, clear, and exact description.

This invention relates to a speedometer actuated road guide in which a sheet or ribbon bearing sequential items of informative matter such as, mileage, geographical stations and topographical places is supported upon and actuated by suitable reels, one of which is directly connected to the speedometer for moving the sheet or ribbon across a suitable sight-opening and thereby indicating the mileage traveled and places along the line of travel, which may be of interest or information to the driver of an automobile in touring from one place to another.

The main object is to operate the informative sheet by and in synchronism with the registering mechanism of the speedometer, and to bring both of the mechanisms into close juxtaposition so that both may be seen by the operator at a glance.

Another object is to provide simple and efficient means whereby the driving mechanism for the informative sheet may be easily and quickly connected to and disconnected from the resetting-device of the speedometer without in any way altering the parts of the latter.

Other objects and uses relating to specific parts of the device will be brought out in the following description:

In the drawings:

Fig. 1 is a front elevation of a standard speedometer and my improved informative device associated therewith.

Fig. 2 is a horizontal sectional view taken on line 2—2, Fig. 1.

Figs. 3 and 4 are transverse sectional views taken respectively, on lines 3—3 and 4—4, Fig. 1.

Fig. 5 is a longitudinal sectional view taken on line 5—5, Fig. 3.

Fig. 6 is an inner face view of a portion of the reel-housing and adjacent portion of the supporting plate showing the cam for adjusting said housing.

Fig. 7 is an enlarged detail sectional view taken on line 7—7, Fig. 1.

Fig. 8 is a detail sectional view taken in the plane of line 8—8, Fig. 5 showing one of the clutch connections between the reel and one of its supporting spindles.

As illustrated, the speedometer as —A— and the informative-device are mounted side by side upon one and the same supporting-plate —1—, which may be secured by screws —2— to the dash or switch-board of the motor vehicle directly in front of the driver's seat, where both may be viewed by the operator at any time from the driving position.

The speedometer —A— may be of any standard construction having the usual speed and mileage registers —3—, —4— and —5— and resetting-wheel as —6— which is attached to a shaft as —7— at a point external to the case in which the registering mechanisms are held, the registering mechanism being operatively connected to a driving-shaft —8— which in turn may be driven in any well known manner by some revolving part of the motor vehicle for operating the speed and mileage registers —3— and —4—.

The housing of the speedometer is usually circular and is secured in an opening in the plate —1—, while the housing for the informative-device is preferably rectangular and is secured to the same plate —1— at one side of the housing of the speedometer with a sufficient space between to permit the free operation of the resetting-wheel —6— and also for the reception of the connections between the shaft —7— and driving mechanism for the informative sheet, presently described.

The outer end of the shaft —7— is journaled in a post or bracket —9— on the rear face of the plate —1— between the housing of the speedometer and that of the informative-device so as to better support the wheel —6— against radial movement.

A pinion —10— is secured to the outer end of the shaft —7— to rotate therewith and constitutes a part of the driving mechanism for the informative sheet, and for this purpose meshes with a relatively larger gear —11— which in turn meshes with a relatively smaller gear —12— on the outer end of a reel actuating spindle —13—, as shown more clearly in Fig. 5.

The spindle —13— is journaled in a bearing —14— on one end of a housing —15— which encloses a pair of spools —16— and —17—, and a web or ribbon —18— bearing the informative items such as geographical stations or topographical places and mileage of said stations or places from a given point arranged sequentially lengthwise of the sheet.

The end of the reel —16— opposite the spindle —13— is supported upon a spindle —13'— which in turn is journaled in a bearing —19— on the adjacent side of the housing —15—.

The hub of the spool or reel —16— is preferably tubular and is slidable endwise on the adjacent ends of the spindles —13— and —13'— with which it is operatively connected by suitable clutch-connections to cause the reel to rotate with the spindles, one of which as —13'— is provided with a reduced end extending outwardly through the hub —19— and is provided with a hand-piece —20— by which the spindle —13'— may be withdrawn from engagement with the adjacent end of the reel —16— against the action of a spring —21— to permit the removal of said reel when desired, as for example in changing reels with different informative sheets or webs thereon.

The hub of the other reel —17— is also tubular and is supported upon suitable spindles —22— and —23— with connections similar to those described for the reel —16— to enable the reel —17— to be removed or replaced when desired, one of the spindles as —23— having a reduced end extending outwardly through the adjacent hub as —24— and provided with a hand-piece —25— by which it may be withdrawn against the action of a spring —26— to release the reel —17—, the opposite spindle being journaled in a bearing —27— on the housing —15—.

The clutch-connection between the reel —17— and spindle —22— is omitted to allow their relative rotation one upon the other in reverse direction since the gear —11— is positively driven, in one direction indicated by the arrow Fig. 3, by the pinion —10— to transmit rotary motion to the gear —12— which, in turn, transmits motion in the same direction to its reel —16— through the medium of the clutch-connection between said reel and the adjacent spindle —13—, while the reel —17— is rotated through the medium of the web or sheet —18—, as indicated by the arrow in Fig. 4.

The web —18— is first wound upon the reel —17— and when installed in the housing —15— is attached to the winding-reel —16—, the intermediate portion of the web being drawn across a suitable bridge —28— just at the rear of a sight-opening —29— in the plate —1—, the adjacent portion of the ribbon being protected against the elements or foreign matter by transparent plate —30— of glass or other suitable material which is secured to the rear face of the plate —1—, as shown in Fig. 4, and also in Fig. 2.

Suitable means is provided whereby the gear —11— may be disengaged by the pinion —10— and for this purpose, the housing —15— is provided at its outer side with a flange —31— lying flatwise against the adjacent portion of the plate —1— and pivoted at —32— thereto to allow the housing with the gears —11— and —12— and reels —16— and —17— thereon to swing about the axis of the pivot —32— a sufficient distance to disengage the gear —11— from the pinion —10—, which is mounted on the plate —1— the opposite or inner side of said housing being provided with flanges —33— and —34— which also lie flatwise against the adjacent portion of the plate —1—, as shown in Fig. 5 and also in Fig. 3.

A relatively small bearing-plate —35— Figure 7 is secured by screws —36— to the plate —1— to overlap upon the flange —33— and is provided with a circular bearing —37— registering with a similar circular bearing —38— in the plate —1— for receiving a rotary cam-member —39— which is passed through a vertically elongated opening —40— in the flange —33— of the housing and is provided with a substantially flat cam-face —41— for engaging a similar flat face —42— forming the upper wall of the opening —40—, as shown in Figs. 6 and 7.

The cam-member —39— is adapted to be rotated at will, and for this purpose is provided with an external hand-piece —43— engaging the outer face of the plate —1— to hold the cam against inward displacement while the inner end is provided with a washer —44— and a screw —45— for engaging the inner face of the bearing-member —35— to hold the cam against outward displacement.

A suitable pointer —46— is also secured to the hand-piece —43— to rotate therewith around a suitable dial —48— on the outer face of the plate —1— to indicate the different positions of the housing —15— and gear —11— relatively to the driving pinion —10—, that is, whether the connection with the speedometer is "off" or "on."

By rotating the cam —39— in one direction through a limited arc against the action of a retracting spring —54—, the housing —15— will be rocked about the axis of its pivot —32— and the gear —11— will be brought into engagement with the driving pinion —10— for transmitting motion to the web —18— through the medium of the gear —12— which meshes with the gear —11—, the arc of movement of the cam —39— being limited by suitable stop pins —50—, Figure 1.

*Operation.*

When the speedometer is in operation, rotary motion will be transmitted from its shaft —7— to the reel —16— through the medium of the gears —10—, —11— and —12— to wind the web —18— upon the reel —16— and to unwind it from the reel —17—, thereby causing the intermediate portion of the ribbon to travel upwardly across the sight-opening —29— to indicate to the driver the geographical or topographical places approached by the machine and the mileage of those places from a predetermined point or starting place, the longitudinal spacing of the geographical or topographical places on the web —18— and also the spaces of the mileage on said web being arranged to harmonize or to appear at the sight-opening —29— simultaneously with the corresponding mileage appearing on the register —5—, as shown in Fig. 1.

These webs or sheets —18— will, of course, be printed to give the desired information for different tours usually between the larger cities and more prominent places of beginning and ending, and may be readily attached to one of the reels as —17— or detached therefrom, and when attached is wound upon the reel —16— in the manner previously described.

The reels —17— may also be easily and quickly detached and reinstalled and used in other similar registering devices if desired, the ends of the web or sheet being inserted in suitable slits in the tubular hubs of the reels for attachment thereto.

The plate —1— is provided with an opening in its front side registering with the adjacent open side of the housing —15— to permit access to the reels and the web, and normally closed by a plate —1'— having one or more lugs —51— interlocking with the rear face of the plate —1— just above the upper wall of the opening, while the lower edge is provided with a clutch —52— adapted to be operated by a rotary hand-piece —53—, as shown in Fig. 4, to lock and unlock the cover-plate —1'— in and from its closed position.

What I claim is:

1. In a route indicator of the character described, a supporting plate having a circular opening and a rectangular opening arranged side by side in horizontally spaced relation, a speedometer secured in the circular opening, a pinion driven by the speedometer, a cover plate removably secured across the rectangular opening, hand-operated means for tightening and releasing the cover plate, a housing pivoted to the supporting plate at one side of the rectangular opening farthest from the circular opening to swing parallel with the supporting plate and having its open side registering with said rectangular opening at the back of the cover plate, route-indicating means mounted in the housing and including a gear movable into and out of mesh with said pinion as the housing is rocked in reverse directions on its pivot, and means operable at will for operating said housing.

2. In a route indicator of the character described, a supporting plate, a drive-shaft journaled on the plate and provided with a pinion, a housing pivoted to the plate to swing in a plane parallel therewith, route-indicating means mounted in the housing and including a gear movable into and out of mesh with said pinion as the housing is rocked in reverse directions for actuating and stopping the route indicating means, and means operable at will for rocking said housing on its pivot.

3. A route-indicator as in claim 2, in which the supporting plate is provided with an opening and a movable closure therefor covering one side of the housing when in place, said closure having a sight opening therein, the route indicating means including a web movable across the sight opening and bearing the route indicating matter.

In witness whereof I have hereunto set my hand this 24th day of March, 1921.

ORVIS W. VALLIER.

Witnesses:
 T. H. LYNCH,
 BERT J. SNIDER.